United States Patent
Ramjit et al.

(10) Patent No.: US 11,428,096 B2
(45) Date of Patent: Aug. 30, 2022

(54) DATA ACQUISITION AND SIGNAL DETECTION THROUGH RFID SYSTEM AND METHOD

(71) Applicant: ConocoPhillips Company, Houston, TX (US)

(72) Inventors: Avinash L Ramjit, Houston, TX (US); Zachary L Zbranek, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/051,602

(22) Filed: Aug. 1, 2018

(65) Prior Publication Data
US 2019/0040738 A1    Feb. 7, 2019

Related U.S. Application Data

(60) Provisional application No. 62/539,625, filed on Aug. 1, 2017.

(51) Int. Cl.
| | | |
|---|---|---|
| E21B 47/13 | (2012.01) | |
| H04L 67/12 | (2022.01) | |
| E21B 41/00 | (2006.01) | |
| E21B 47/26 | (2012.01) | |
| E21B 47/0232 | (2012.01) | |

(52) U.S. Cl.
CPC .............. *E21B 47/13* (2020.05); *E21B 41/00* (2013.01); *E21B 47/0232* (2020.05); *E21B 47/26* (2020.05); *H04L 67/12* (2013.01)

(58) Field of Classification Search
CPC .................................................. E21B 47/122
See application file for complete search history.

(56) References Cited

U.S. PATENT DOCUMENTS

| | | | | |
|---|---|---|---|---|
| 9,418,266 | B1* | 8/2016 | Malone | G06Q 10/0833 |
| 2005/0011645 | A1* | 1/2005 | Aronstam | E21B 47/01 |
| | | | | 166/250.11 |
| 2009/0043545 | A1* | 2/2009 | van Manen | G06F 17/5018 |
| | | | | 703/2 |
| 2010/0200244 | A1* | 8/2010 | Purkis | E21B 34/066 |
| | | | | 166/373 |
| 2011/0155368 | A1* | 6/2011 | El-Khazindar | E21B 47/00 |
| | | | | 166/250.01 |
| 2012/0012392 | A1 | 1/2012 | Kumar | |
| 2012/0133526 | A1* | 5/2012 | Christiansen | G01V 15/00 |
| | | | | 340/854.6 |
| 2013/0271066 | A1 | 10/2013 | Signorelli et al. | |
| 2016/0335464 | A1 | 11/2016 | Ownby et al. | |

OTHER PUBLICATIONS

International Search Report and Written Opinion dated Oct. 18, 2018 in related International Application No. PCT/US18/44751, 9 pp.
Snider P., "RFID Downhole Tools and Development, Drilling Environment," RFID Downhole, Drilling Engineering Association, Jun. 23, 2009, 17 Pages.

* cited by examiner

*Primary Examiner* — Amine Benlagsir
(74) *Attorney, Agent, or Firm* — Polsinelli PC

(57) ABSTRACT

A data acquisition and signal detection through radio frequency identification (RFID) system and a method of using the system are provided. The system includes a base station, a receiver, and an RFID device. The system is operable to be used with a wellbore and a drill string during a drilling process to obtain data regarding properties of the wellbore and/or the drill string.

20 Claims, 3 Drawing Sheets

DATA ACQUISITION AND SIGNAL DETECTION THROUGH RFID SYSTEM AND METHOD

CROSS-REFERENCE TO RELATED APPLICATION

This application claims the benefit of U.S. Provisional Application Ser. No. 62/539,625, filed Aug. 1, 2017, which is incorporated herein by reference in its entirety.

FIELD OF THE INVENTION

The present inventive concept relates to a data acquisition and signal detection through radio frequency identification (RFID) system and method. In particular, the present inventive concept concerns a system operable to obtain data regarding properties of a wellbore during a drilling process by circulating an RFID device through the wellbore via a drill string, and a method of using the system.

BACKGROUND OF THE INVENTION

The process of forming an oil or gas well, i.e., a wellbore, presents a number of challenges due to changing and uncertain drilling conditions, which translates to high operating costs due to inefficiencies associated with such. In attempt to improve efficiency of a drilling process, it is desirable to obtain wellbore data related to the drilling conditions during the drilling process to permit an operator of the drilling process to adapt to the drilling conditions.

Conventional systems and methods for obtaining wellbore data suffer from slow data transfer rates, interrupted data transfers, and low quality data with insufficient information. Thus, in many instances, data obtained via the conventional systems and methods is inaccurate, which prevents the operator from improving efficiency of the drilling process.

Accordingly, there is a need for a system and method operable to obtain high quality wellbore data during a drilling process.

SUMMARY OF THE INVENTION

The present inventive concept provides a data acquisition and signal detection through radio frequency identification (RFID) system and method. The system generally includes a base station, a receiver, and an RFID device. The system is operable to be used with a wellbore and a drill string to obtain high quality, detailed data regarding properties of the wellbore and/or the drill string during a drilling process. The method discloses steps for continuously obtaining the data of the wellbore and/or the drill string using the system. The system and method of the present inventive concept advantageously allow an operator to adjust one or more parameters of the drilling process, e.g., a trajectory of a wellbore, during the drilling process in view of the data, thereby improving efficiency of the drilling process.

The aforementioned may be achieved in an aspect of the present inventive concept by providing a data acquisition and signal detection system. The system may include a base station. The base station may be positioned proximate to a surface of a wellbore. The base station may be operable to distribute a radio frequency identification (RFID) device down a wellbore via an opening of a drill string.

The system may further include a receiver. The receiver may be positioned proximate to the surface of the wellbore. The receiver may be configured to detect the device via a signal when the device travels up an annulus of the wellbore. The receiver may be configured to acquire data from the device. The device may be configured to be programmed by the base station. The device may be configured to receive a command from a command sub of the drill string. The device may be configured to obtain the data. The device may be configured to permit transmission of the data to the receiver. The device may be operable to travel out of the drill string via a bit of the drill string, up the annulus of the wellbore via a fluid within the wellbore, and/or to the surface of the wellbore. The device may be configured to obtain the data from a sensor operable to measure a property of the wellbore. The device may be configured to store the data. The device may be encapsulated by a casing. The device may be operable to be reprogrammed by the base station, and/or recirculated within the wellbore. The device may be operable to store the data via a read/write memory.

The sensor may be positioned on the device or along the drill string. The receiver may be operable to wirelessly detect the device, and/or receive the data from the device. The receiver may be operable to decode the data, and/or transmit decoded data to a database. The system may be operable to capture the device via a filter positioned proximate to the surface of the wellbore.

The aforementioned may be achieved in another aspect of the present inventive concept by providing a method to obtain data of a wellbore via a data acquisition and signal detection system. The method may include the step of distributing, via a base station positioned proximate to a surface of a wellbore, a radio frequency identification (RFID) device down the wellbore via a drill string. The device may be configured to receive a command from a command sub of the drill string, and/or obtain data associated with a property of the wellbore. The device may be encapsulated by a casing.

The method may further include the step of circulating a fluid, via a pump, to cause the device to travel down the drill string, out of a bit of the drill string, up an annulus of the wellbore, and/or to a surface of the wellbore. The method may further include the step of detecting, via a receiver positioned proximate to the surface of the wellbore, the device as the device travels from the bit and to the surface of the wellbore. The method may further include the step of acquiring, via the receiver, the data of the device. The method may further include the step of programming the device, via the base station, to receive the command from the command sub.

The device may be configured to obtain the data from a sensor operable to measure a property of the wellbore, and/or store the data. The device may be operable to store the data via a read/write memory. The sensor may be positioned on the device or along the drill string.

The method may further include the step of wirelessly detecting the device via the receiver. The method may further include the step of wirelessly receiving the data from the device via the receiver. The method may further include the step of decoding the data received from the device via the receiver. The method may further include the step of transmitting decoded data to a remote device via the receiver. The method may further include the step of capturing the device via a filter positioned proximate to the surface of the wellbore. The method may further include the step of resetting the device via the base station. The method may further include the step of recirculating the device within the wellbore via the pump.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawing. For the purpose of illustration, there is shown in the drawing certain embodiments of the present inventive concept. It should be understood, however, that the present inventive concept is not limited to the precise embodiments and features shown. The accompanying drawing, which is incorporated in and constitutes a part of this specification, illustrates an implementation of apparatuses consistent with the present inventive concept and, together with the description, serves to explain advantages and principles consistent with the present inventive concept, in which.

DETAILED DESCRIPTION

Figure 1:
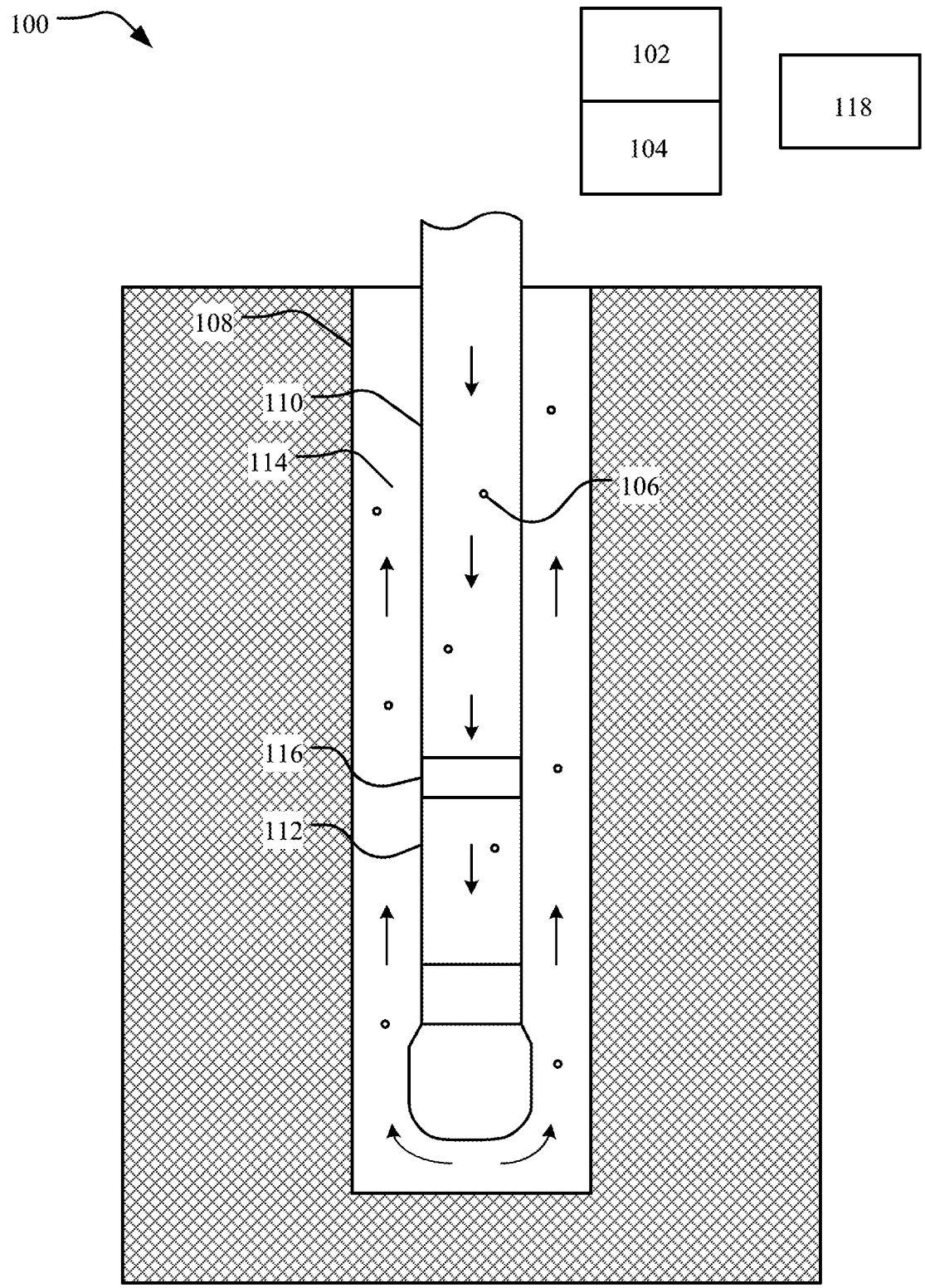
FIG. 1 is a diagram illustrating a data acquisition and signal detection through radio frequency identification (RFID) system of the present inventive concept with a base station, a receiver, and an RFID device in use with a wellbore and a drill string.

The following detailed description references the accompanying drawing that illustrates various embodiments of the present inventive concept. The illustration and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the description, phraseology and terminology are employed for the purpose of description and should not be regarded as limiting. For example, the use of a singular term, such as "a", is not intended as limiting of the number of items. Also, the use of relational terms such as, but not limited to, "down" and "up", are used in the description for clarity in specific reference to the figure and are not intended to limit the scope of the present inventive concept or the appended claims. Further, any one of the features of the present inventive concept may be used separately or in combination with any other feature. For example, references to the term "embodiment" means that the feature or features being referred to are included in at least one aspect of the present inventive concept. Separate references to the term "embodiment" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present inventive concept as described herein are not essential for its practice.

Further, in certain situations, the term "logic" refers to hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic. Logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical or other form of propagated signals such as carrier waves, infrared signals, or digital signals. Examples of non-transitory storage medium may include, but are not limited or restricted to a programmable circuit, a semiconductor memory, non-persistent storage such as volatile memory, e.g., any type of random access memory "RAM", persistent storage such as non-volatile memory, e.g., read-only memory "ROM", power-backed RAM, flash memory, phase-change memory, etc., a solid-state drive, hard disk drive, an optical disc drive, or a portable memory device. As firmware, the executable code is stored in persistent storage.

The term "operator" is generally used herein to represent a user of the system and/or method of the present inventive concept. For purposes herein, the user may be an administrator of the system, a drilling engineer, or a team of engineers.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Turning to FIG. 1, a data acquisition and signal detection through radio frequency identification (RFID) system 100 is illustrated, which includes a base station 102, a receiver 104, and an RFID device 106. The system 100 is illustrated in use with a wellbore 108 and a drill string 110.

The wellbore 108 is a hole extending into the ground formed via a drilling process using the drill string 110. A depth of the wellbore 108 can range from a few feet to over a mile into the ground and can extend in one or more directions. The drill string 110 includes a drill pipe and a bottom hole assembly (BHA) 112 positioned at a bottom of the drill string 110. The BHA 112 includes a plurality of components. In the exemplary embodiment, the BHA 112 includes a steering unit, a mud motor, a drill motor, a drill collar, and a drill bit. It is foreseen that the BHA 112 may include fewer or additional components without deviating from the scope of the present inventive concept. The drill string 110 extends into the wellbore 108 so that the bit of the BHA 112 is in contact with a geological formation to crush or scrape the geological formation, thereby increasing a length of the wellbore 108 in a downward direction and/or a lateral direction. The bit may be driven by a top drive system at a surface of the wellbore 108 or by the mud motor positioned near the bit.

A drilling mud or a drilling fluid 114 is continuously circulated within the wellbore 108 via a pump to facilitate operation of the BHA 112, e.g., drilling. The fluid 114 is introduced into the drill string 110 via an opening of the drill string 110 and pumped down the drill string 110 and through the BHA 112 via the pump. The fluid 114 exits the drill string 110 through the bit and circulates upwards through an annulus of the wellbore 108. The fluid 114 has multiple functions including, but not limited to, cooling the bit, lubricating the bit, and/or transporting debris generated by the bit away from the bit, e.g., up the annulus of the wellbore 108 and to the surface of the wellbore 108. The fluid 114 may be water, oil, a synthetic based composition, gas, or a combination thereof, and may include one or more additives and/or particles.

The base station 102 is positioned proximate to the surface of the wellbore 108. In the exemplary embodiment, the base station 102 is an inlet surface sub positioned on the drill string 110 at the surface of the wellbore 108, but it is foreseen that the base station 102 may be located elsewhere without deviating from the scope of the present inventive concept. For instance, in another embodiment, the base station 102 is located adjacent to the surface of the wellbore 108.

The base station 102 includes logic and is configured to wirelessly program the device 106 and deliver or distribute the device 106 into the wellbore 108 via an opening in the drill string 110. When the device 106 is introduced into the drill string 110, the fluid 114 being pumped into the wellbore 108 via the drill string 110 causes the device 106 to travel down the drill string 110 and out of the drill string 110 via an opening in the bit. When the device 106 exits the drill string 110, the fluid 114 causes the device 106 to travel up the annulus of the wellbore 108 and to the surface of the wellbore 108.

The device 106 includes a plurality of components. In the exemplary embodiment, the device 106 includes an RFID tag, an antenna, a memory, and a power source, which are encapsulated via a sealed, waterproof, temperature-resistant, and impact-resistant casing. It is foreseen that the device 106 may include fewer or additional components without deviating from the scope of the present inventive concept. In the exemplary embodiment, the RFID tag of the device 106 is an active RFID tag operable to continuously transmit data, but it is foreseen that the RFID tag may be a passive RFID tag operable to only receive or transmit data when excited or triggered, e.g., by the base station 102 of the receiver 104.

The casing of the device 106 is operable to protect the device 106 from the harsh environment of the drill string 110 and the wellbore 108, and is devoid of any flat surfaces, thereby facilitating travel of the device 106 through the drill string 110 and the wellbore 108 via the fluid 114. The device 106 is sized and shaped to travel through the drill string 110 and pass through any opening or port in the BHA 112 and into the wellbore 108 without obstructing the opening and/or port. In the exemplary embodiment, the casing is a plastic sphere. It is foreseen, however, that the casing may be otherwise shaped, e.g., bullet shaped, and/or made of another durable material, e.g., metal or a combination of metal and plastic, without deviating from the scope of the present inventive concept.

The device 106 is configured to wirelessly obtain the data via a sensor operable to measure one or more properties of the wellbore 108 and/or the drill string 110. In the exemplary embodiment, the sensor is a plurality of individual sensors positioned along the drill string 110, e.g., in and/or above the BHA 112. Each of the plurality of individual sensors is operable to measure one of the properties of the wellbore 108 and/or the drill string 110. For instance, the plurality of individual sensors may be operable to measure strain, e.g., via a strain gauge, temperature, e.g. via a temperature sensor, density and porosity, e.g. via a sound sensor, and/or other properties of the wellbore 108 and/or the drill string 110. The plurality of sensors may also be operable to measure inclination, e.g., via an accelerometer, magnetic direction, e.g., via a magnetometer, and gamma, e.g., via a gamma ray sensor. It is foreseen that one or more of the plurality of individual sensors may be positioned on the device 106 without deviating from the scope of the present inventive concept. For instance, in an embodiment, the device 106 includes an accelerometer, thereby allowing the device 106 to measure vibration within the BHA 112.

The device 106 is programmed by the base station 102 with a unique identification number, which is stored in the memory of the base station 102 for further processing as discussed hereafter. The base station 102 also programs the device 106 to only receive data from the sensor after the device 106 has wirelessly received a command, e.g., an activation command or a search command, from a command sub 116 to begin searching for the sensor. In a scenario where multiple sensors are utilized by the system 100, the base station 102 is operable to program the device 106 to only obtain data from one of the plurality of individual sensors regarding one property of the wellbore 108 and/or the drill string 110. For instance, the base station 102 may program the device to only obtain data regarding a trajectory of the wellbore 108 from one of the sensors operable to measure such. In this manner, the command is related to a measurement of a drilling parameter such as, but not limited to temperature, flow rate, magnetic interference, and/or depth.

As the device 106 travels down the drill string 110 via the fluid 114, the fluid 114 causes the device 106 to pass by the command sub 116. In the exemplary embodiment, the command sub 116 is a component positioned along the drill string 110 and between the BHA 112 and the surface of the wellbore 108. It is foreseen, however, that the command sub 116 may be positioned anywhere above the BHA 112 or integrated within the BHA 112 without deviating from the scope of the present inventive concept.

In the exemplary embodiment, the command sub 116 is active, i.e., continuously broadcasting the command for reception via the device 106. It is foreseen, however, that the command sub 116 may be passive, i.e., only broadcasting the command when the command sub 116 is excited or triggered by the device 106, without deviating from the scope of the present inventive concept. When the command is received by the device 106, the command activates the device 106 and/or causes the device 106 to begin searching for the sensor as programmed by the base station 102. In this manner, the device 106 is operable to receive the data from the sensor after receiving the command from the command sub 116. It is foreseen that the device 106 may be operable to obtain the data without the command from the command sub 116. For example, the device 106 may be programmed to obtain the data at a predetermined time interval such as, but not limited to, a time-based interval or a distance-based interval. For example, the device 106 may be configured to record data on a per foot basis. In another example, the device 106 may be configured to record data every ten seconds. Alternatively, the device 106 may be programmed to continuously obtain data until the device 106 runs out of memory space. In the exemplary embodiment, the device 106 has a read/write memory, but it is foreseen that the device 106 may have another type of memory without deviating from the scope of the present inventive concept.

After the device 106 travels through the BHA 112 and obtains the data from the sensor, the device 106 travels up from the BHA 112 via the annulus of the wellbore 108, and towards the surface, where the device 106 transmits the data to the receiver 104.

The receiver 104 is positioned proximate to the surface of the wellbore 108 and along a pathway of and in communication with the drilling fluid 114. For example, the receiver 104 may be in a flow line or mud pit of the drilling fluid 114. In the exemplary embodiment, the receiver 104 is positioned on the drill string 110 at the surface of the wellbore 108 and is in communication with and integrated within the base station 102. It is foreseen, however, that the receiver 104 may be located elsewhere without deviating from the scope of the present inventive concept. For instance, in another embodiment, the receiver 104 is a separate component of the system 100 relative to the base station 102, and is located adjacent to the surface of the wellbore 108 and spaced from the base station 102.

The receiver 104 includes a plurality of components. In the exemplary embodiment, the receiver 104 includes logic, a wireless identification and sensing platform (WISP), a memory, and a wireless transmitter. It is foreseen that the receiver 104 may include fewer or additional components without deviating from the scope of the present inventive concept. The WISP is configured to wirelessly detect the device 106 and operable to draw power from a signal generated and emitted by the device 106. In this manner, the WISP is activated when the device 106 travels to within a predetermined proximity or zone of the WISP, e.g., twenty feet. It is foreseen, however, that the WISP may be configured to continuously search for the device 106.

Upon detection of the device 106, the receiver 104 is operable to acquire the data from the device 106 and process or decode the data in connection with the unique identifier of the device 106, which is matched with the unique identifier in the memory of the base station 102. In this manner, the system 100 enables tracking of temporal data, e.g., a timeframe for circulation of the device 106 through the wellbore 108, and an approximate time the data was obtained from the sensor regarding one of the properties of the wellbore 108 and/or the drill string 110.

The receiver 104 is operable to wirelessly communicate or transmit the data decoded by the receiver 104 to a remote device 118 for further processing, analysis and action by an operator of the system 100, and/or storage in a database of the remote device 118. In this manner, the operator of the system 100 may inspect the decoded data, understand one or more drilling conditions of the drilling process, and selectively modify one or more parameters of the drilling process, e.g., speed and/or trajectory of the drill motor via the BHA 112. It is foreseen that the system 100 may include logic enabling automatic modification of one or more parameters of the drilling process, upon receipt and analysis of the data, without deviating from the scope of the present inventive concept. It is foreseen that the remote device 118 may be operable to sort and store the data based on one of the properties of the wellbore 108 and/or the drill string 110. For instance, the remote device 118 is operable to sort the data based on temperature in combination with the unique identifier, thereby enabling chronological sorting of the data, which allows the operator to obtain temperature of the drilling process as well as any changes in temperature of the drilling process over a period of time.

After the device 106 has been circulated through the wellbore 108, the device 106 is physically captured via a capture device or a filter, which is in fluid communication with the fluid 114. In the exemplary embodiment, the filter is integrated within the base station 102, but it is foreseen that the filter may be a separate component of the system 100 and located elsewhere relative to the base station 102. After the device 106 has been captured, the device 106 is operable to be reconfigured and redeployed to obtain new data from the sensor, thereby allowing the system 100 to obtain updated data. The time interval between deployment of the device 106, circulation of the device 106 through the wellbore 108, and receipt of the data by the receiver 104 is generally determined by the speed of the fluid 114 being pumped through the wellbore 108 via the pump. The fluid 114 generally circulates quickly given it is desirable to quickly remove the debris from the drill bit and wellbore 108 to ensure effective drilling. Thus, time between distribution and receiving the device 106 is a generally small time period, e.g., ten to thirty minutes, dependent on the depth of the wellbore 108 and circulation rate of the fluid 114.

The system 100 is operable to distribute a large number of the devices 106 into the wellbore 108 at a constant interval, e.g., distribute one of the devices 106 into the wellbore 108 every thirty seconds. In the exemplary embodiment, the devices 106 are identically sized and shaped, and include the same components, which may be configured to receive data from the same or different ones of the sensors. It is foreseen, however, that the devices 106 may be sized and/or shaped differently without deviating from the scope of the present inventive concept.

In use, the system 100 is operable to obtain the data of the wellbore 108 via distributing, via the base station 102, the device 106 down the wellbore 108 via the drill string 110. As previously discussed, the device 106 is configured to receive the command from the command sub of the drill string 110, and obtain the data. By circulating the fluid 114 via the pump, the device 106 is caused to travel down the drill string 110, out of the bit of the drill string 110, up the annulus of the wellbore 108, and to the surface of the wellbore 108 in the fluid 114. Next, the system 100 wirelessly detects, via the receiver 104 positioned proximate to the surface of the wellbore 108, the device 106 via a signal of the device 106 as the device 106 travels from the bit and to the surface of the wellbore 108. Next, the system 100 wirelessly acquires, via the receiver 104, the data of the device 106. Prior to distributing the device 106 down the wellbore 108, the base station 102 programs the device 106 to receive the command from the command sub 116. Further, the base station 103 programs the device 106 to obtain the data from the sensor operable to measure the property of the wellbore 108, and to store the data via the memory of the device 106, e.g., a read/write memory. Next, the system 100 via the receiver 104 decodes the data received from the device 106 and transmits decoded data to the remote device 118. Finally, the system 100 captures the device 106 via the filter positioned proximate to the surface of the wellbore 108, resets and/or reprograms the device 106 via the base station 102, and recirculates the device 106 within the wellbore via the pump.

Figure 2:
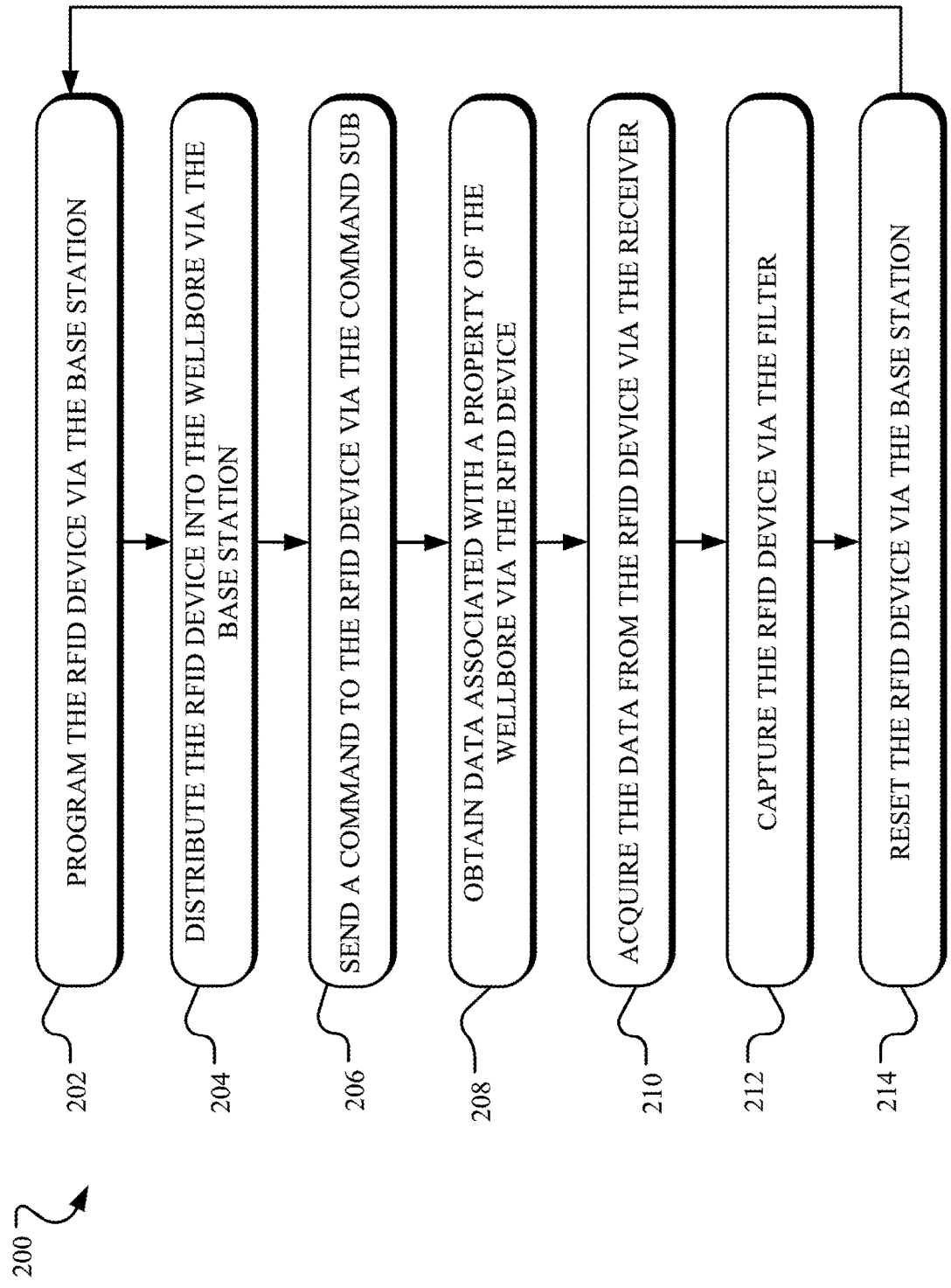
FIG. 2 is a flow chart illustrating a method of using the RFID device of FIG. 1 to continuously obtain data during a drilling process.

FIG. 2 illustrates a method 200 of using the device 106 to continuously obtain data during the drilling process. In the first step 202, the device 106 is programmed via the base station 102 to (i) receive the command from the command sub 116, and/or (ii) obtain and store the data from the sensor operable to measure the property of the wellbore 108. In the second step 204, the device 106 is distributed into the wellbore 108 via the base station 102. In the third step 206, the command is sent to the device 106 via the command sub 116. In the fourth step 208, the device 106 obtains the data via the sensor operable to measure the property of the wellbore 108. In the fifth step 210, the data is acquired from the device 106 via the receiver 104. In the sixth step 212, the device 106 is captured via the filter. In the seventh step 214, the device 106 is reset by deleting the data and reprogramming the device 106 via the base station 102, after which step the method 200 may be repeated.

Figure 3:
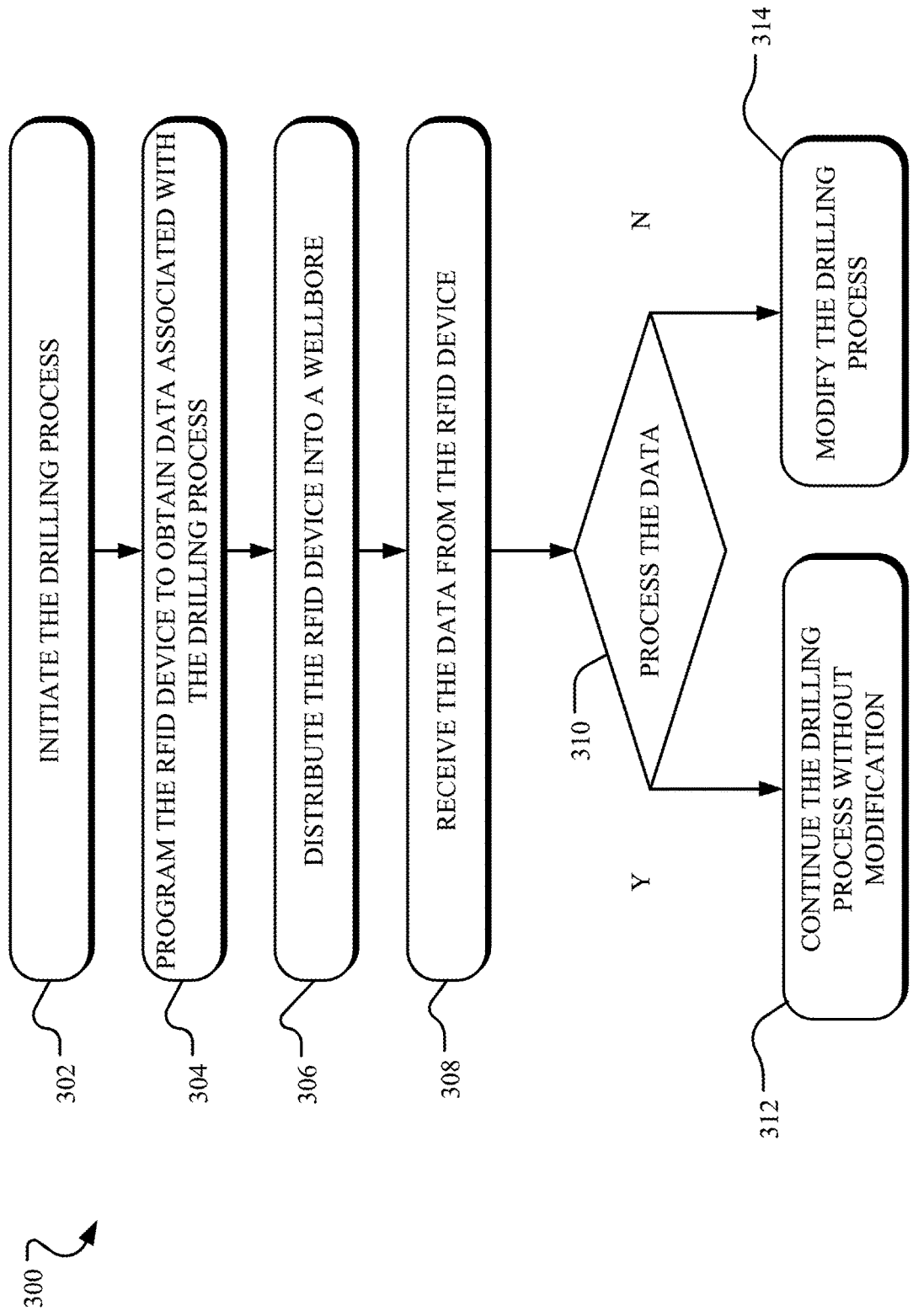
FIG. 3 is a flow chart illustrating a method of operating a drilling process via the RFID device of FIG. 1.

FIG. 3 illustrates a method 300 of operating the drilling process. In the first step 302, the drilling process is initiated. In the second step 304, the device 106 is programmed via the base station 102 to obtain the data from the sensor operable to measure the property of the drilling process and/or the wellbore 108. In the third step 306, the device 106 is distributed into the wellbore 108 via the base station 102. In the fourth step 308, the data is acquired from the device 106. In the fifth step 301, the data is analyzed to determine if the drilling process is within one or more parameters. If it is determined that that the drilling process is within the one or more parameters, then the drilling process continues without any modification to the drilling process. If it is determined that that the drilling process is not within the one or more parameters, then the drilling process is modified in view of the data.

Accordingly, the present inventive concept provides a data acquisition and signal detection through RFID system operable to obtain high quality, detailed data regarding properties of a wellbore and/or a drill string during a drilling process and a method of using the system.

It will be appreciated by those skilled in the art that changes could be made to the embodiments described above without departing from the broad inventive concept thereof. It is understood, therefore, that the present invention disclosed herein is not limited to the particular embodiments disclosed, and is intended to cover modifications within the spirit and scope of the present invention.

What is claimed is:

1. A data acquisition and signal detection system comprising:
   a base station (i) positioned proximate to a surface of a wellbore, and (ii) operable to distribute a radio frequency identification (RFID) device down the wellbore via an opening of a drill string;
   a command sub (i) secured along the drill string, and (ii) operable to wirelessly communicate a command to the device as the device travels through the drill string without searching for any sensor, the command operable to cause the device to begin searching for at least one sensor when the device receives the command from the command sub; and
   a receiver (i) positioned proximate to the surface of the wellbore, (ii) configured to detect the device via a signal when the device travels up an annulus of the wellbore, and (iii) configured to acquire data from the device.

2. The system of claim 1, wherein, the device is operable to travel (i) out of the drill string via a bit of the drill string, (ii) up the annulus of the wellbore via a fluid within the wellbore, and (iii) to the surface of the wellbore.

3. The system of claim 1, wherein, the device is configured to (i) obtain the data from the at least one sensor, the at least one sensor operable to measure a property of the wellbore, and (ii) store the data.

4. The system of claim 3, wherein, the device is operable to store the data via a read/write memory.

5. The system of claim 3, wherein, the at least one sensor is positioned on the device or along the drill string.

6. The system of claim 1, wherein, the receiver is operable to wirelessly (i) identify the device, and (ii) receive the data from the device.

7. The system of claim 6, wherein, the receiver is operable to (i) decode the data, and (ii) transmit the decoded data to a database.

8. The system of claim 1, wherein, the device is encapsulated by a casing.

9. The system of claim 1, wherein, the system is operable to capture the device via a filter positioned proximate to the surface of the wellbore.

10. The system of claim 9, wherein, the device is operable to be (i) reprogrammed by the base station, and (ii) recirculated within the wellbore.

11. A method to obtain data of a wellbore via a data acquisition and signal detection system, the method comprising steps of:
    distributing, via a base station positioned proximate to a surface of the wellbore, a radio frequency identification (RFID) device in an inactive state down the wellbore via a drill string, the device configured to (i) receive a command from a command sub of the drill string to change from the inactive state and begin searching for at least one sensor when the device passes the command sub in the wellbore, and (ii) obtain the data from the at least one sensor, the data associated with a property of the wellbore;
    circulating a fluid, via a pump, to cause the device to travel (i) down the drill string, (ii) out of a bit of the drill string, (iii) up an annulus of the wellbore, and (iv) to the surface of the wellbore;
    detecting, via a receiver positioned proximate to the surface of the wellbore, the device as the device travels from the bit and to the surface of the wellbore; and
    acquiring, via the receiver, the data of the device.

12. The method of claim 11, further comprising the step of:
    programming the device, via the base station, to receive the command from the command sub.

13. The method of claim 11, wherein,
the device is configured to (i) obtain the data from the at least one sensor, the at least one sensor operable to measure a property of the wellbore, and (ii) store the data.

14. The method of claim 13, wherein,
the device is operable to store the data via a read/write memory.

15. The method of claim 13, wherein,
the at least one sensor is positioned on the device or along the drill string.

16. The method of claim 11, further comprising the steps of:
wirelessly identifying the device via the receiver; and
wirelessly receiving the data from the device via the receiver.

17. The method of claim 16, further comprising the steps of:
decoding the data received from the device via the receiver; and
transmitting decoded data to a remote device via the receiver.

18. The method of claim 11, further comprising the step of:
capturing the device via a filter positioned proximate to the surface of the wellbore.

19. The method of claim 18, further comprising the steps of:
resetting the device via the base station; and
recirculating the device within the wellbore via the pump.

20. The method of claim 11, wherein,
the device is encapsulated by a casing.

* * * * *